T. S. SAVAGE.
GASOLENE GAGE.
APPLICATION FILED JULY 25, 1917. RENEWED OCT. 28, 1918.
1,314,983.
Patented Sept. 2, 1919.
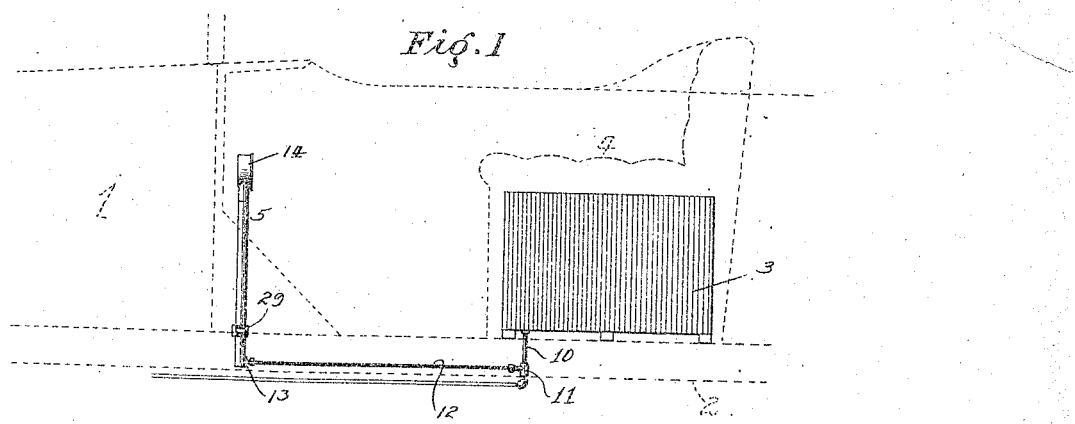
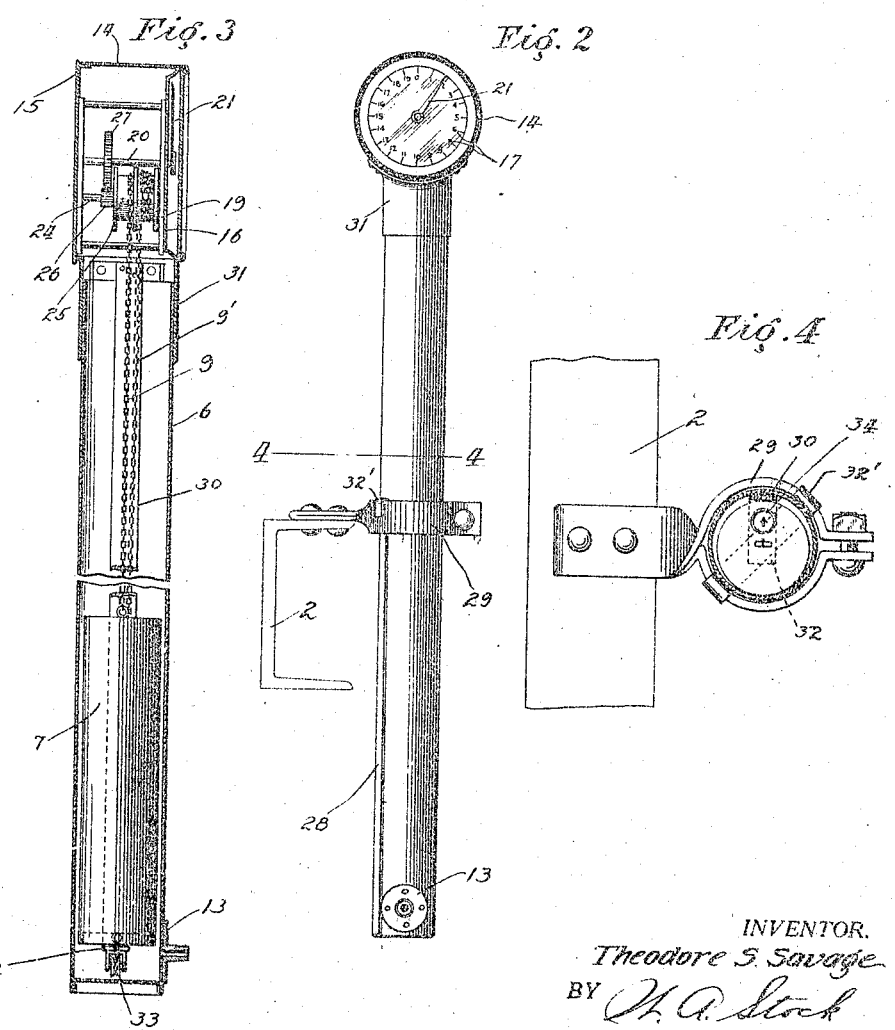
INVENTOR.
Theodore S. Savage
BY
ATTORNEY.

UNITED STATES PATENT OFFICE.

THEODORE S. SAVAGE, OF OAKLAND, CALIFORNIA.

GASOLENE-GAGE.

1,314,983.          Specification of Letters Patent.          Patented Sept. 2, 1919.

Application filed July 25, 1917, Serial No. 182,769. Renewed October 23, 1918. Serial No. 260,074.

*To all whom it may concern:*

Be it known that THEODORE S. SAVAGE, a citizen of the United States, residing at Oakland, in the county of Alameda and State of California, has invented certain new and useful Improvements in Gasolene-Gages, of which the following is a specification.

This invention relates to improvements in gages and more particularly to a device of this character that is suitable for indicating the amount of gasolene in the tanks of motor vehicles.

The principal object of the present invention is to provide a device which may be positioned in the front of the car in view of the driver and connected to the gasolene tank in such a manner that it will indicate the amount of liquid in the latter.

A still further object of the present invention is to provide a device which is simple in construction, which may be installed in existing vehicles with a minimum amount of labor and which will give accurate indications.

With these and other objects in view, the invention consists of certain novel features of construction, combinations and arrangements of parts hereinafter described and more specifically pointed out in the appended claim; it being understood that changes in form, proportion, size and minor details of construction within the scope of the claim may be resorted to without departing from the spirit of the invention or sacrificing any of the advantages thereof.

Referring to the drawing forming a part of this specification,

Figure 1—is a view in side elevation showing in dotted outlines an automobile with my improved gage installed therein.

Fig. 2—is a view in front elevation of the gage and the manner of attaching to the vehicle.

Fig. 3—is a vertical section through the same.

Fig. 4—is a view in section on the line 4—4, Fig. 2.

Referring to corresponding parts in the several views by the same numerals of reference, 1 denotes a vehicle having the longitudinal frame member 2 and the liquid fuel tank 3. As here shown, this tank is located under the driver's seat 4, but it will be understood that the gage is equally applicable where the tank is located in the rear of the vehicle. My improved gage is denoted generally by 5 and consists of the cylindrical tube 6, the lower end of which extends below the bottom of the tank 3. Within this tube is a float 7 to the top and bottom of which are connected flexible chains or cables 9 and 9'.

The tank 3 is provided with a pipe 10 leading to the carbureter, not shown, and installing my device, I insert a T 11 in this line from which is extended a pipe 12 to the flange nipple 13 at the bottom of the tube 6. The distance which this tube extends below the bottom of the tank is governed by the depth of the float below the surface of the liquid, the distance of the tube below the bottom of the tank being such that it contains just sufficient liquid to cause the member 7 to float, when the liquid level in the tank is lowest.

On the upper end of the tube 6 is mounted a circular casing 14 which is provided with a removable rear plate 15 and a dial plate 16 having graduations 17. These graduations may indicate either the inches of liquid in the tank, or the gallons. In the former case a standard dial plate may be used for any shaped tank while in the latter case, it will be necessary to provide a different dial plate for each size and shape tank on which the device is used.

Back of the dial plate is a frame 19 in which is pivotally mounted a shaft 20 which extends through the dial plate and has attached thereto an indicator arm 21.

Adjacent this shaft is pivotally mounted a second shaft 24 on which is attached a double drum 25, the upper ends of chains 9 and 9' being attached to the periphery of this drum and so that they wind thereon in opposite directions. Attached to shaft 24 or to one side of the drum 25, is a toothed pinion 26 which is adapted to mesh with a gear 27 carried by shaft 20.

A strip 30 extends longitudinally of the tube 6 and has its upper end attached to collar 31 on head 14. The collar 31 is removably attached to the tube 6 and when taken therefrom the strip 30 thus comes with it. The bottom of the strip is bent to form a foot 32 which extends to the center of the tube and is there provided with the grooved pulley 33.

Float 7 is provided with a longitudinal passageway 34 through which the chain 9' may pass, this portion of the chain extending through suitable openings in the foot 32 around pulley 33 and being attached to the bottom of the float.

The gage is held in place by means of a clamp 29 which is attached to some portion of the vehicle frame such as the longitudinal member 2. In order that the tubular portion of the device may not slide downwardly in this clamp, I provide a U-shaped band 28 which passes under the bottom of the tube and has its upper ends bent around the clamp as shown at 32'.

In use the device is installed with the bottom end of tube 6 positioned as heretofore described. The length of tube 6 must be such that the casing 15 is above the top of the tank 3, then when the latter is filled, the liquid flows through the pipe 12 into the bottom of the casing causing the member 7 to float. As the depth of the liquid increases in the tank, this float rises to a higher level taking its weight off chain 9 and causing the downward movement of chain 9'.

During this movement of the float the drum 25 is turned by chain 9' being unwound, and at the same time chain 9 is wound a corresponding amount on the other half of the drum. This moves the pointer arm from zero to the higher numerals.

On the contrary, when the tank is emptied the float falls and its weight pulling on chain 9 is sufficient to rotate the drum in the opposite direction, thereby winding up chain 9' and causing the pointed arm to move toward zero.

I claim as new and wish to cover by Letters Patent:—

A gage of the character described comprising in combination with a liquid tank, a tube having its lower end below the bottom of said tank and in communication therewith, a float in said tube adapted to commence rising when the liquid level in said tank is at the lowermost point thereof, a head on said tube, an indicator revolubly mounted in said head, a drum having two grooves revolubly mounted in said head, geared connection between said indicator and said drum, a grooved pulley rotatably mounted in the bottom of said tube, and flexible cables adapted to wind in the grooves of said drum in opposite directions, one of said cables being attached to the top of said float, and the other extending around said pulley and attached to the bottom of said float.

In testimony whereof I affix my signature.

THEODORE S. SAVAGE.